United States Patent
Kraemer et al.

(10) Patent No.: US 8,572,381 B1
(45) Date of Patent: Oct. 29, 2013

(54) CHALLENGE PROTECTED USER QUERIES

(75) Inventors: Jeffrey A. Kraemer, Wellesley, MA (US); Philip J. S. Gladstone, Carlisle, MA (US)

(73) Assignee: Cisco Technology, Inc., San Jose, CA (US)

( * ) Notice: Subject to any disclaimer, the term of this patent is extended or adjusted under 35 U.S.C. 154(b) by 1312 days.

(21) Appl. No.: 11/348,069

(22) Filed: Feb. 6, 2006

(51) Int. Cl.
*G06F 21/00* (2013.01)

(52) U.S. Cl.
USPC .................. 713/170; 726/2; 726/16; 726/17; 726/22; 726/29

(58) Field of Classification Search
USPC .................................. 713/170; 726/23, 24, 25
See application file for complete search history.

(56) References Cited

U.S. PATENT DOCUMENTS

| | | | | |
|---|---|---|---|---|
| 4,962,473 | A * | 10/1990 | Crain | 340/541 |
| 5,675,321 | A * | 10/1997 | McBride | 340/568.2 |
| 6,195,698 | B1 * | 2/2001 | Lillibridge et al. | 709/225 |
| 6,199,102 | B1 * | 3/2001 | Cobb | 709/206 |
| 6,681,392 | B1 * | 1/2004 | Henry et al. | 717/176 |
| 7,069,580 | B1 * | 6/2006 | Deitz et al. | 726/2 |
| 7,139,916 | B2 * | 11/2006 | Billingsley et al. | 713/182 |
| 7,603,706 | B2 * | 10/2009 | Donnelly et al. | 726/22 |
| 2001/0051989 | A1 * | 12/2001 | Moncreiff | 709/206 |
| 2003/0055962 | A1 * | 3/2003 | Freund et al. | 709/225 |
| 2003/0204569 | A1 * | 10/2003 | Andrews et al. | 709/206 |
| 2004/0059951 | A1 * | 3/2004 | Pinkas et al. | 713/202 |
| 2004/0093582 | A1 * | 5/2004 | Segura | 717/102 |
| 2004/0230835 | A1 * | 11/2004 | Goldfeder et al. | 713/201 |
| 2004/0254793 | A1 * | 12/2004 | Herley et al. | 704/270 |
| 2005/0065802 | A1 * | 3/2005 | Rui et al. | 705/1 |
| 2005/0114705 | A1 * | 5/2005 | Reshef et al. | 713/201 |
| 2005/0278253 | A1 * | 12/2005 | Meek et al. | 705/50 |
| 2006/0218145 | A1 * | 9/2006 | Butcher et al. | 707/6 |
| 2007/0101148 | A1 * | 5/2007 | Schutz et al. | 713/182 |
| 2007/0143624 | A1 * | 6/2007 | Steeves | 713/182 |

OTHER PUBLICATIONS

Rusu et al., Handwritten CAPTCHA: using the difference in the abilities of humans and machines in reading handwritten words, Oct. 2004, Ninth International Workshop on Frontiers in Handwriting Recognition, 2004, pp. 226-231.*

* cited by examiner

*Primary Examiner* — Taghi Arani
*Assistant Examiner* — Kenneth Chang
(74) *Attorney, Agent, or Firm* — Hickman Palermo Truong Becker Bingham Wong LLP (57) ABSTRACT

A method, apparatus and computer program product for providing challenge protected user queries on a local system is presented. A query is presented to a user. A response to the query is received and a determination is made whether the response is administratively less desirable than a threshold. When the response is administratively less desirable than said threshold, then a challenge is provided to the user. The response is accepted when the user responds correctly to the challenge and the response is not accepted when the user fails to correctly respond to the challenge.

11 Claims, 5 Drawing Sheets

CHALLENGE PROTECTED USER QUERIES

BACKGROUND

Computer systems, networks and data centers are exposed to a constant and differing variety of attacks that may compromise the security and/or operation of the system. Examples include various forms of malicious software program attacks such as viruses, worms, Trojan horses and the like that computer systems can obtain over a network such as the Internet. Quite often, users of such computer systems are not even aware that such malicious programs have been obtained within the computer system. Once resident within a computer, a malicious program that executes might disrupt operation of the computer to a point of inoperability and/or might spread itself to other computers within a network or data center by exploiting vulnerabilities of the computer's operating system or resident application programs. Virus attacks, worm attacks, and Trojan horse attacks are variants of each other that generally involve the execution of a program, for which a user often is unaware of its existence, that performs some undesired processing operations to comprise a computer's proper operation.

Other malicious programs operate within a computer to secretly extract and transmit information within the computer to remote computer systems for various suspect purposes. As an example, spyware is a form of software that can execute in the background (e.g., unbeknownst to users) of a computer system and can perform undesirable processing operations such as tracking, recording and transmitting user input from the spyware-resident computer system to a remote computer system. Spyware can allow remote computers to silently obtain otherwise confidential information such as usernames and passwords required to access protected data, lists, contents of files or even a remote web site's user account information.

Computer system developers, software developers and security experts have produced many types of conventional preventive measures that operate within conventional computer systems in an attempt to prevent operation of malicious programs from stealing information or from compromising proper operation of the computer systems. As an example, conventional virus detection software operates to periodically download a set of virus definitions from a remotely located server. Once the virus detection software obtains the definitions, the security software can monitor incoming data received by the computer system, such as email messages containing attachments, to identify viruses defined within the virus definitions that might be present within the data accessed by the computer. Such data might be obtained over a network or might be unknowingly resident on a computer readable medium, such as a disk or CD-ROM, which a user inserts into the computer. Upon detection of inbound data containing a virus or other malicious program, the virus detection software can quarantine the inbound data so that a user of the computer system will not execute code or access the data containing the detected virus that might result in compromising the computer's operation.

Other examples of conventional malicious attacks, intrusions, or undesirable processing that can cause problems within computer systems or even entire computer networks include denial-of-service attacks, buffer overflow operations, execution of malformed application data, and execution of malicious mobile code. A denial-of-service attack operates to provide an intentional simultaneous barrage of packets (e.g., many connection attempts) emanating from many different computer systems to one or more target computer systems, such as a web site, in order to intentionally cause an overload in processing capabilities of the target computer resulting in disruption of service or a business function provided by the target computer. Denial of service attacks may also seek to crash the targeted machine, rather than simply consume resources. Buffer overflow attacks occur when programs do not provide appropriate checks of data stored in internal data structures within the software that result in overwriting of surrounding areas of memory. Attacks based on buffer overflows-might allow an attacker to execute arbitrary code on the target system to invoke privileged access, destroy data, or perform other undesirable functions. Malformed application data attacks might result in an application containing a code section that, if executed, provides access to resources that would otherwise be private to the application. Such attacks can expose vulnerabilities due to an incorrect implementation of the application, for example by failing to provide appropriate data validity checks or allowing data stream parsing errors.

Many of the conventional malicious programs and mechanisms for attack of computer systems, such as viruses and worms, include the ability to redistribute themselves to other computer systems or devices within a computer network, such that several computers become infected and experience the malicious processing activities discussed above. Some conventional attempts to prevent redistribution of malicious programs include implementing malicious program detection mechanisms such as virus detection software within firewalls or gateways between different portions of networked computer systems in order to halt propagation of malicious programs to sub-networks.

Another conventional methodology used to control behavior in a system is through the use of an access control list (ACL). The access control list is a concept in computer security, used to enforce privilege separation. It is a means of determining the appropriate access rights to a given object given certain aspects of the user process that is requesting them, principally the process's user identity. An ACL typically comprises a table that tells a computer operating system which access rights each user has to a particular system object, such as a file directory or individual file. Each object has a security attribute that identifies its access control list. The list has an entry for each system user with access privileges. The most common privileges include the ability to read a file (or all the files in a directory), to write to the file or files, and to execute the file (if it is an executable file, or program). Each ACL has one or more access control entries (ACEs) including the name of a user or group of users. For each of these users or groups roles, the access privileges are stated in a string of bits called an access mask. Generally, the system administrator or the object owner creates the access control list for an object.

SUMMARY

Conventional mechanisms such as those explained above suffer from a variety of deficiencies. Many security products built for desktop systems support some level of interaction with the end-user. These often take the form of configuring the product via a local UI or asking the user security related questions via a query mechanism.

At the same time, a trend is developing where malware (both trojan and virus) are specifically attempting to circumvent commercial security products, often trying to disable it in some fashion. Additionally, there have been instances where, upon detecting a specific security product, the malware will attempt to programatically answer security related queries intended for the end-user. As an example, the Zone Labs personal firewall was targeted by a trojan which knew how to answer 'yes' when the end-user was queried as to whether or not the trojan application should be given network access.

Embodiments of the invention significantly overcome such deficiencies and provide mechanisms and techniques that provide a mechanism to defeat program answers to security related queries. When a user is asked a question, a configured set of acceptable responses is displayed to the user for selection along with a default action for this query. If the response to the query is considered "less" secure than the administratively defined default, the user is presented with a challenge. If the user correctly answers the challenge, the response to the query is accepted. If the user fails to correctly answer the challenge, the user response to the query is not accepted.

In a particular embodiment of a method for providing challenge protected user queries on a local system, the method includes presenting a query to a user and receiving a response to the query. A determination is made whether the response is administratively less desirable (e.g., less secure) than a threshold (e.g., a default response). When the response is administratively less desirable than said threshold, then a challenge (e.g. a nonce) is provided to the user. The response is accepted when the challenge is correctly answered and the response is not accepted when the response to the challenge is incorrect.

Other embodiments include a computer readable medium having computer readable code thereon for providing challenge protected user queries on a local system. The medium includes instructions presenting a query to a user. The medium also includes instructions for receiving a response to the query and for determining whether the response is administratively less desirable than a threshold. When the response is administratively less desirable than said threshold, then a challenge is provided to the user. The response is accepted when the challenge is answered correctly, and the response is not accepted when the challenge is not correctly answered.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides challenge protected user queries on a local system as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing challenge protected user queries on a local system as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

One method of preventing the potential compromise of system security involves using a Security Agent (SA). The SA provides threat protection for server and desktop computing systems, also known as endpoints. The SA helps to reduce operational costs by identifying, preventing, and eliminating known and unknown security threats. The SA consolidates endpoint security functions in a single agent, providing host intrusion prevention, spyware/adware protection, protection against buffer overflow attacks, distributed firewall capabilities, malicious mobile code protection, operating-system integrity assurance, application inventory and audit log-consolidation. One example of an SA is the Cisco Security Agent (CSA) available from Cisco Systems, Inc. of San Jose, Calif.

Figure 1:
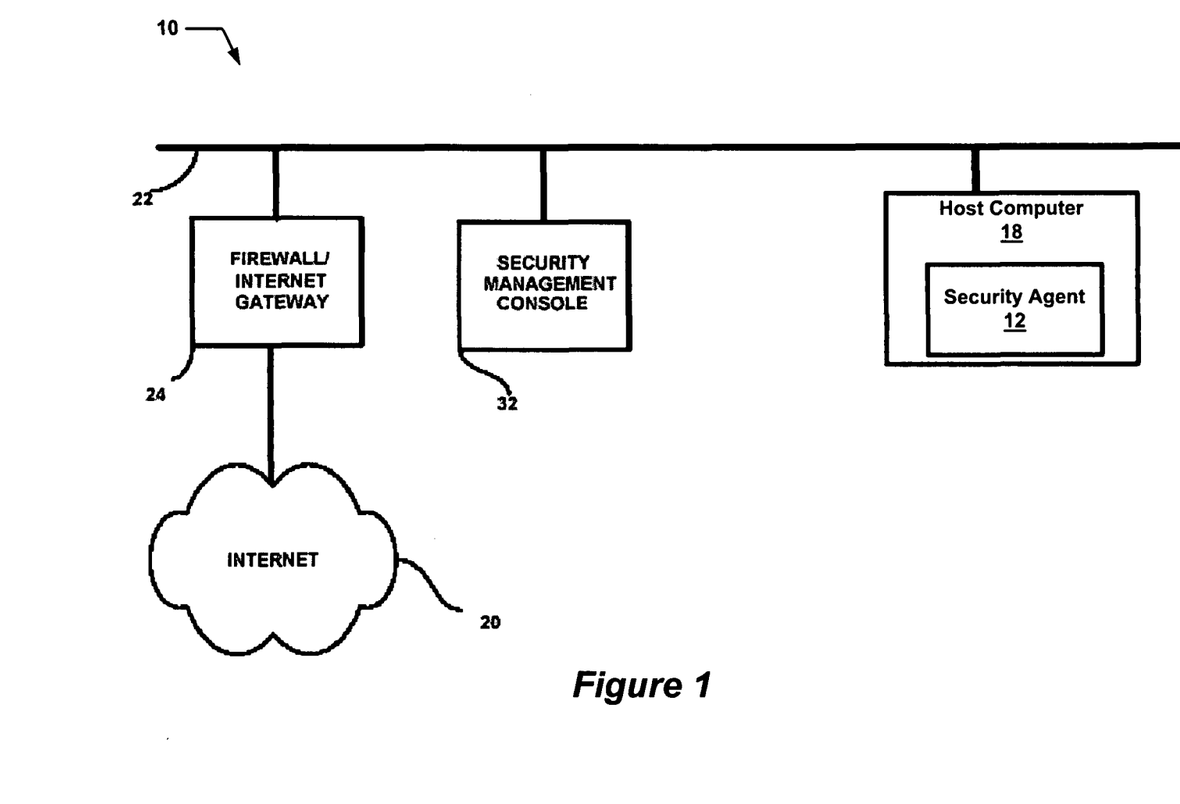
FIG. 1 comprises a block diagram of a particular embodiment of system for performing challenge protected user queries.

Referring to FIG. 1, an embodiment of a CSA system is shown. The CSA environment 10 includes one or more security agents 12 on a host computer 18. The host computer 18 couples to a public access network such as the Internet 20 via a local interconnection 22 such as a local area network (LAN) and a local Internet Service Provider (ISP) 24 or other Internet connection or gateway and a security management console (MC) 32. The security agent 12 reports any malware objects and signatures to management console 32. The management console 32 may choose to distribute the signature to other agents 12 to prevent access to the malicious object and therefore prevent propagation of undesirable effects of the malware object.

The Cisco Security Agent is a host based Intrusion Prevention system. It is an application centric, behavioral based system. Security policies control applications accessing certain system or network resources, ultimately allowing or denying access to the specified resource. The system also supports a query mechanism, where the end user can specify whether an action should be allowed, denied, or even deny the action and terminate the offending process. These potential responses are viewed as having a level of precedence when denying access is considered more "secure" than allowing access to a resource.

The method, apparatus and computer software which produces challenge protected user queries provides a mechanism to defeat program answers to security related queries. When a user is asked a question, a configured set of acceptable responses is displayed to the user for selection along with a default action for this query. If the response to the query is considered "less" secure than the administratively defined default, the user is presented with a graphic displaying a nonce, which the end-user must then type in. The nonce is intended to be easy for a human to read and re-enter, but difficult for a program to do likewise.

The method, apparatus and computer software which produces challenge protected user queries has advantages over the prior art. The present invention prevents programmatic attacks which attempt to answer security related questions. By being configurable, only the most sensitive queries may need this protection. The challenge is conditional in that it is only issued when a "less" secure answer is provided. This makes challenge less intrusive, since most users choose the query default (which is typically to deny access in a fail closed architecture). Using a nonce or similar security code to challenge the user reduces complexity for the administrator. A shared secret could also have been used but this may actually be less secure and may not scale to an enterprise deployment.

Schemes that are geared to prevent miscreants from signing up for large numbers of mail accounts on hotmail use security codes to prevent repeated programmatic submission of forms. This is essentially a challenge for every submission of a given form. The present invention is geared toward only challenging users who answer queries in a manner more permissive (or less secure) than the specified default, thus the challenge is conditional, wherein in the prior art, the challenges are unconditional in that they are provided every time a task is attempted. Further, the present invention deals with a local system only, wherein the task is local to the system, the challenge is local to the system and the security of the local system is potentially compromised by the task.

Figure 2A:
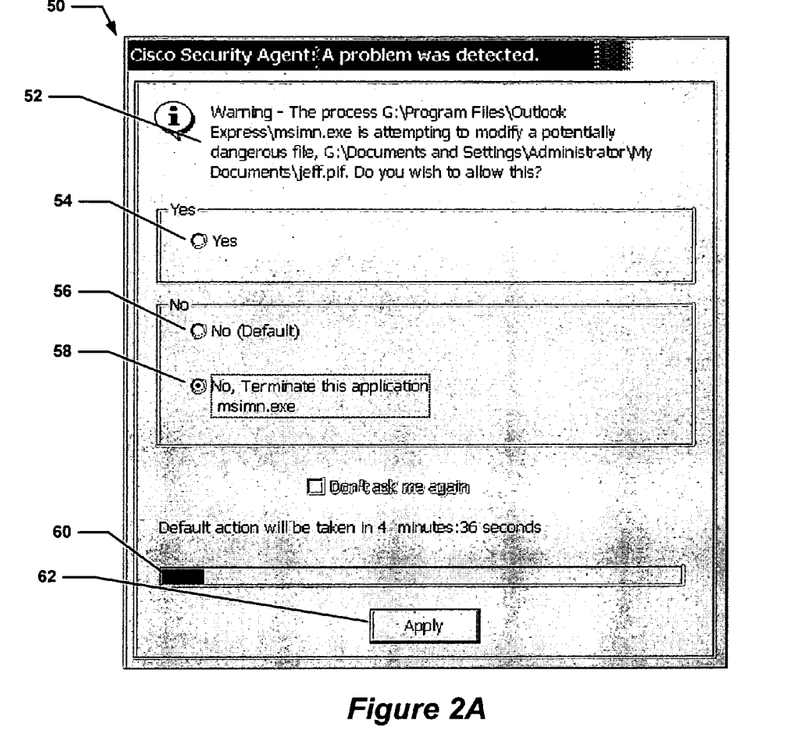
FIG. 2A comprises an example Graphical User Interface (GUI) presented to a user as part of performing challenge protected user queries in accordance with embodiments of the invention.

Referring now to FIG. 2A, a particular embodiment of a GUI 50 for accomplishing challenge protected user queries is shown. The GUI 50 includes a message box presented to the user. In this example the message 52 asks the question "Do you wish to allow this?" in response to the user attempting to modify a potentially dangerous file. The user is presented with three possible answers (54, 56 and 58) including one that is a default answer 56. The default answer 56 is pre-selected as indicated by the button being highlighted. In this example, the default response is "No (default)". If the user is not attempting to modify the file, the user can click on the APPLY button 62, and the default answer is presented to the system. Since the default answer was selected, there is no challenge presented, and operation continues in a normal fashion. Alternately, the user could select the "No (terminate this application msimn.exe" answer 58 by clicking on that answer then clicking the "APPLY" button 62. The "No(terminate this application msimn.exe" answer may be deemed to not be administratively less desirable then the default answer, so this answer is accepted and processing continues.

Should the user select the "Yes" answer 54 by clicking on it then clicking the APPLY button 62, then a determination is made whether the "Yes" action is administratively less desirable than the default answer. In this example, the "Yes" answer 54 is deemed administratively less desirable, and a challenge is issued to the user.

Also shown is a statement 60 regarding the default action being taken after a predetermined period of time if no other action is taken.

Figure 2B:
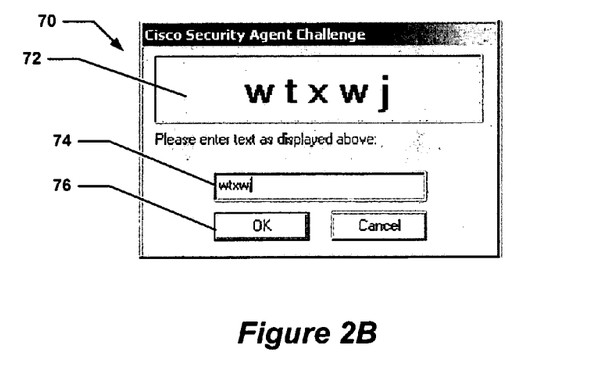
FIG. 2B comprises a an example challenge presented to a user as part of performing challenge protected user queries in accordance with embodiments of the invention.

The GUI 70 for a particular embodiment of a challenge is shown in FIG. 2B. In response to the user selecting an administratively less desirable selection than the default selection the user is presented with a challenge. In this embodiment the challenge is in the form of a nonce 72, although various other forms of challenges could be presented (e.g., audio challenge or similar challenge as would be known by one of ordinary skill in the art). For example, the user could be required to type in a security code or to answer a question. Here the user is presented with a nonce 72 comprising a graphic having characters (wtxwj) which the end-user must then type in. The nonce 72 is intended to be easy for a human to read and re-enter, but difficult for a program to do likewise. The user enters the characters of the nonce into box 74 and then clicks the "OK" button 76 to submit the answer to the challenge.

Figure 3:
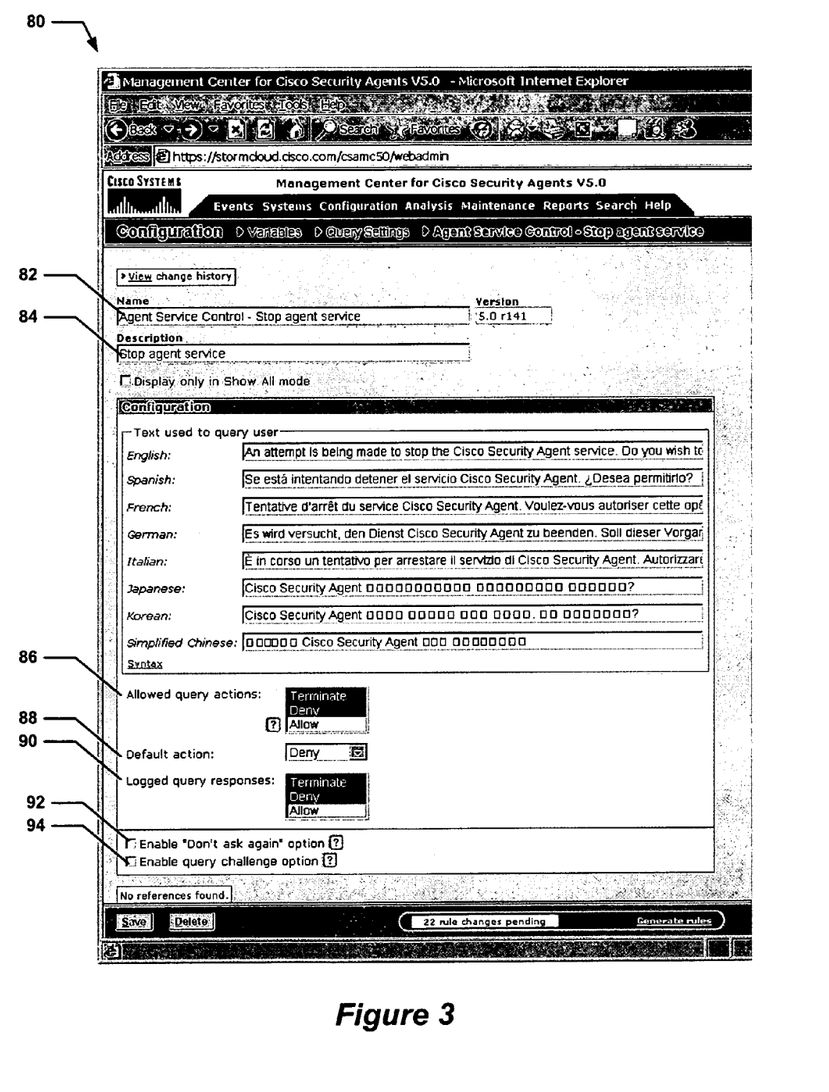
FIG. 3 comprises a screen shot of a security agent application incorporating embodiments of the present invention.

Referring now to FIG. 3, a screen 80 is presented which shows the GUI presented to a security administrator. The security administrator is using this screen to set up challenges for certain actions. The screen is a provided as part of a security agent application. In the event a user attempts a stop agent service action as shown in box 82 and further in box 84, since stopping the security agent service would weaken the security of the system, the user will be presented with a message (challenge) to insure the user intends to perform the stop agent service action. The user will be presented with the allowed query actions 86. One of the allowed query actions will be a default action 88 for the attempted operation. The user may also be presented with a "Don't ask again" option when box 92 is checked and with an "enable query challenge" option when box 94 is checked. By way of the GUI 80, a security administrator can enable query challenges for different operations which may affect system security.

The use of challenges (e.g., nonces) combined with security related queries, when the answer is considered to be "less" secure, is used to validate human interaction and thwart programmatic responses from malware which may be resident on the computer system. The user is required to type in the characters from the graphic in order to proceed. This serves several functions. One reason for doing this is to verify that the user intends to perform an operation which is not the default operation by making the user perform an additional step. Another function provided by the conditional challenge is to prevent malware or other programs from answering questions in order to provide a potential compromise to the security of the local system. The challenge prevents an application from spoofing a user selection which may compromise system security. If the answer to the challenge is incorrect, the action can be terminated or the user may be given another challenge.

Alternately, there may be no default answer, however the available answers are ranked and a threshold defined. If the selected answer is less than the threshold, the user is challenged. The response may be in order according to desirability or may be presented in a random order. Further, in some embodiments, in order to prevent a nefarious act from taking over an application before the user can see and respond to the actions, a time delay may be introduced wherein the buttons are disabled for a predetermined period of time such that the use can review the question and answers. In certain embodiments there may be a time limit for the user to respond to the challenge. This may be used to prevent malware from taking the image of the challenge and sending it to a remote system where it can be decoded and the decoded version returned. Other embodiment may prevent all network communication from taking place while the challenge is being displayed.

The notion of a "less secure" answer can be defined in multiple ways. It could be defined by the precedence of the answers (e.g. from low to high as shown in FIG. 2A), it could be defined by the administrator (e.g. as shown in FIG. 3) or in various similar methods as would be known by one of ordinary skill in the art.

Figure 4:
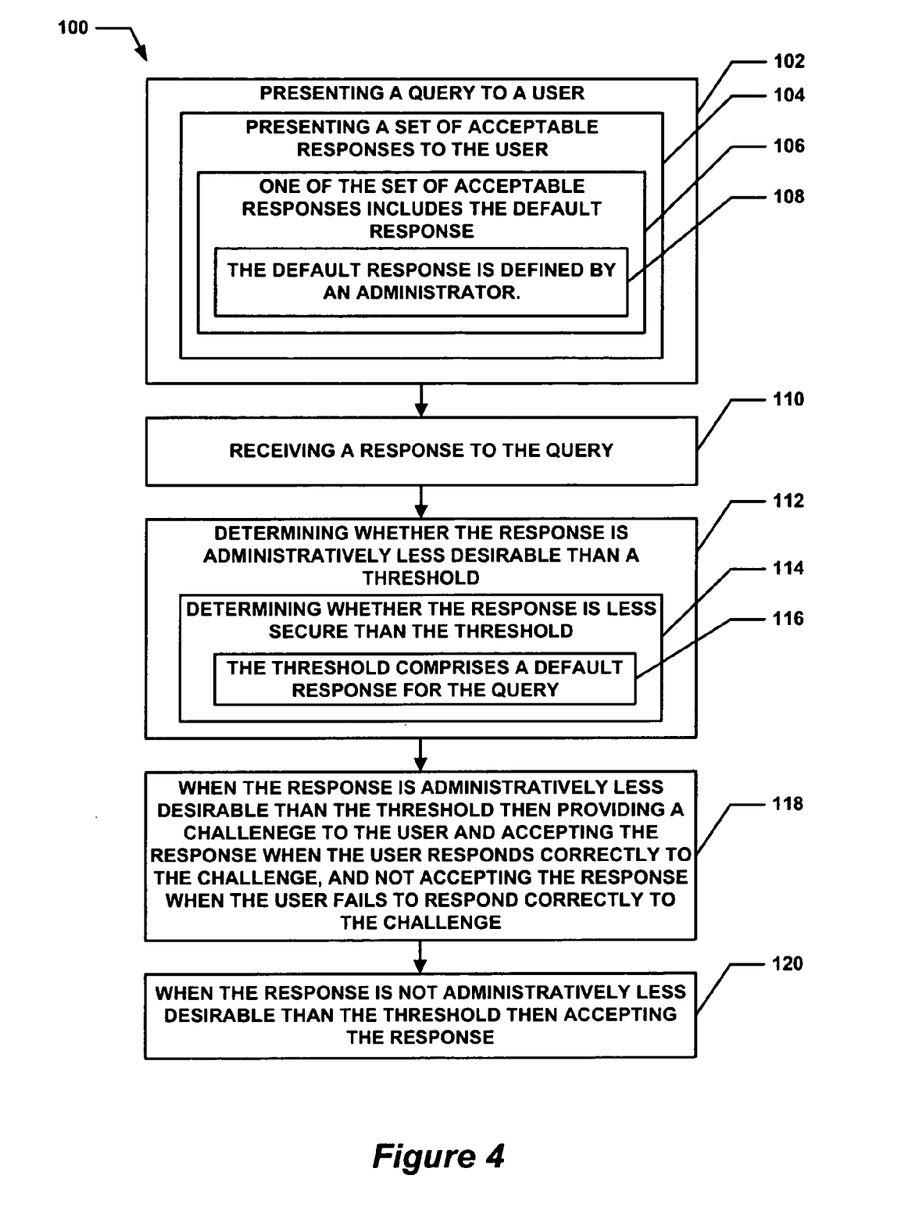
FIG. 4 comprises a flowchart of a particular embodiment of a method for performing challenge protected user queries in accordance with embodiments of the invention.

A flow chart of a particular embodiment of presenting challenge protected user queries is depicted in FIG. 4. The rectangular elements are herein denoted "processing blocks" and represent computer software instructions or groups of instructions. The processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a method 100 of providing challenge protected user queries on a local system is shown. The method begins with processing block 102 which shows presenting a query to a user. This may involve, by way of example, presenting a question to a user who has installed a CD such as "Installing software?". Processing continues at processing block 104 which discloses presenting a set of acceptable responses to said user. In this example, acceptable responses may include: playing music, loading a game, installing software or other. Processing block 106 recites one of the set of acceptable responses includes the default response. For example, playing music may be the default response. Playing music is not a threat to the security of the system, or at the very least is less a threat to system security than installing software might be. Processing block 108 states the default response is defined by an administrator. The administrator may have determined that playing music is the threshold security default for security for this operation.

Processing continues at processing block 110 which states receiving a response to the query. The response is selected by the user, typically by clicking on a selection within a GUI. A default response may be highlighted, and the user has the option of selecting the default response or selecting another response.

Processing block 112 discloses determining whether the response is administratively less desirable than a threshold. Processing block 114 recites determining whether the response is administratively less desirable than a threshold comprises determining whether the response is less secure than said threshold. Processing block 116 states the threshold comprises a default response for said query. A response may be administratively less desirable (e.g., less secure) when it performs some function which could increase the risk of a security issue. For example, a response which allows network access to the local system may be deemed administratively less desirable than a response which would not allow network access to the local system. Similarly, a response which allows operation of an administrator program which could alter security operations of a user may also be deemed administratively less desirable.

Processing block 118 recites that when the response is administratively less desirable than said threshold, a challenge is provided to the user and performing one of the group consisting of accepting the response when the user responds correctly to the challenge, and not accepting the response when the user fails to respond correctly to the challenge. The challenge may be a nonce or security code presented to the user which the user has to enter or could be a simple question such as "What does 3×7=?". One reason for doing this is to verify that the user intends to perform an operation which is not the default operation by making the user perform an additional step, and further to prevent malware or other programs from answering questions in order to provide a potential compromise to the security of the local system.

Processing block 120 discloses accepting the response when the response is not administratively less desirable than said threshold.

Figure 5:
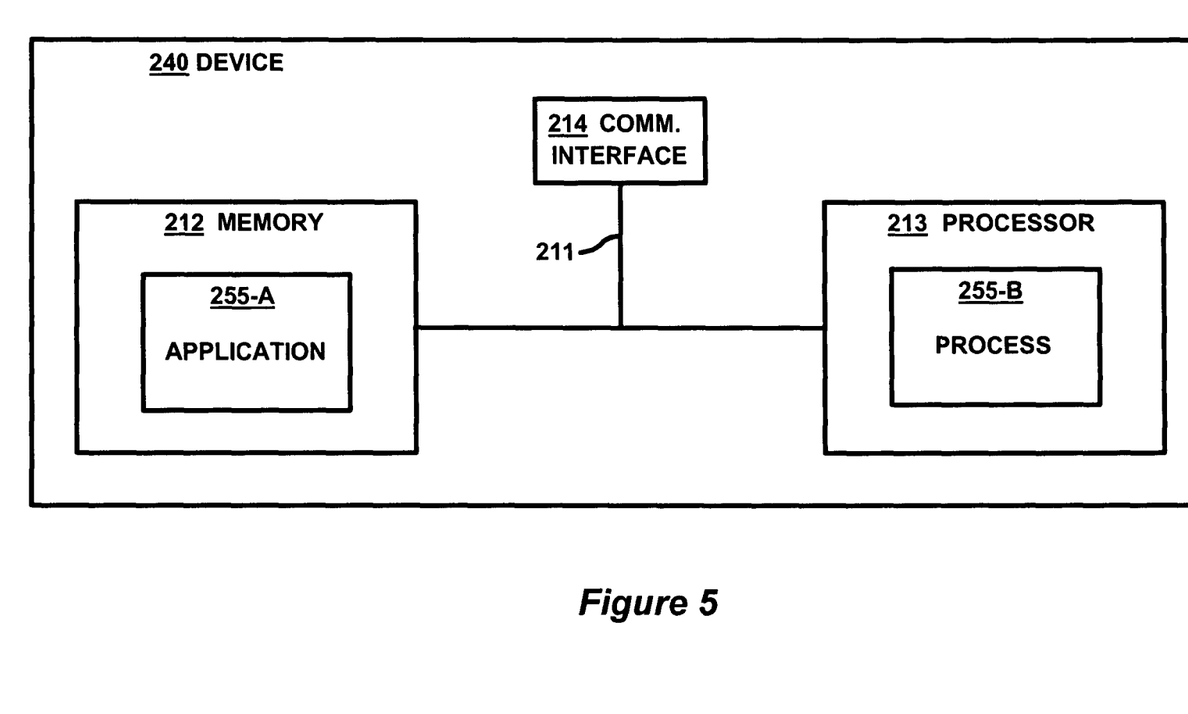
FIG. 5 illustrates an example computer system architecture for a computer system that performs challenge protected user queries in accordance with embodiments of the invention.

FIG. 5 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

What is claimed is:

1. A method of providing challenge protected user queries, the method comprising:
   in response to detecting that an executable process is attempting a modification to a computer system, presenting a query related to the attempted modification and a set of acceptable responses to a user;
   receiving a particular response of the set of acceptable responses to the query; and
   upon determining that the particular response requires further validation of the user:
   providing a challenge to the user; and
   performing one of the group consisting of, accepting the response when the user correctly responds to the challenge, and not accepting the response when the user fails to respond correctly to the challenge;
   wherein the challenge is not provided to the user upon determining that the particular response does not require further validation of the user;
   wherein determining whether the particular response requires further validation of the user comprises at least one of determining whether the particular response is less secure than a threshold, determining whether the particular response is less secure than a default response for the query, and determining whether the particular response indicates that the user accepts a modification that presents a security risk to the computer system;
   wherein the particular response does not require further validation of the user when the particular response denies the modification to the computer system; and
   wherein the method is performed by one or more computing devices.

2. The method of claim 1, where one of the set of acceptable responses includes a default response.

3. The method of claim 2, where the query is presented to the user as a result of the user executable process attempting to install software on the computer system and where the challenge comprises presenting a nonce to the user and requiring the user to enter the nonce.

4. The method of claim 2, where the query is presented to the user as a result of the executable process attempting to disable security software on the user computer and where the challenge comprises presenting a nonce to the user and requiring the user to enter the nonce.

5. A non-transitory computer readable medium having computer readable code thereon for providing challenge protected user queries on a local system, the medium comprising:
   instructions for, in response to detecting that an executable process is attempting a modification to the local system, presenting a query related to the attempted modification and a set of acceptable responses to a user;
   instructions for receiving a particular response of the set of acceptable responses to said query;
   instructions for determining whether said particular response requires further validation of the user; and
   instructions for upon determining that said particular response requires further validation of the user, then:
   providing a challenge to said user; and
   performing one of the group consisting of accepting said response when said user correctly responds to said challenge, and not accepting said response when said user fails to respond correctly to said challenge;
   wherein said instructions for determining whether said particular response requires further validation of the user comprises at least one of instructions for determining whether said particular response is less secure than a threshold, instructions for determining whether said particular response is less secure than a default response for said query, and instructions for requiring further validation of the user when the particular response indicates that the user accepts a modification that presents a security risk to the local system;
   instructions for not requiring further validation when the particular response denies the modification to the local system; and
   wherein the challenge is not provided to the user upon determining that the particular response does not require further validation of the user.

6. The non-transitory computer readable medium of claim 5 wherein said instructions for presenting a set of acceptable responses to said user includes instructions wherein one of said set of acceptable responses includes a default response.

7. The non-transitory computer readable medium of claim 6 wherein said query is presented to said user as a result of said executable process attempting to install software on said local system and wherein said challenge comprises presenting a nonce to said user and requiring said user to enter said nonce.

8. The non-transitory computer readable medium of claim 6 wherein said query is presented to said user as a result of said executable process attempting to disable security software on said local system and wherein said challenge comprises presenting a nonce to said user and requiring said user to enter said nonce.

9. A computer system comprising:
   a memory;
   a processor;
   a communications interface;
   an interconnection mechanism coupling the memory, the processor and the communications interface; and
   wherein the memory is encoded with an application that when performed on the processor, provides a process for of providing challenge protected user queries on a local system, the process causing the computer system to perform the operations of:

in response to detecting that an executable process is attempting a modification to the local system, presenting a query and a set of acceptable responses to a user;

receiving a particular response of the set of acceptable responses to said query;

determining whether said particular response requires further validation of the user; and upon determining that said response requires further validation of the user, then:

providing a challenge to said user; and performing one of the group consisting of accepting said response when said user correctly responds to said challenge, and not accepting said response when said user fails to respond correctly to said challenge;

wherein the determining whether said particular response requires further validation of the user comprises at least one of determining whether said particular response is less secure than a threshold, determining whether said particular response is less secure than a default response for said query, and determining whether the particular response indicates that the user accepts a modification that presents a security risk to the local system;

wherein the particular response does not require further validation of the user when the particular response denies the modification to the local system; and wherein the challenge is not provided to the user upon determining that the particular response does not require further validation of the user.

10. The computer system of claim 9 wherein one of said set of acceptable responses includes a default response.

11. The computer system of claim 9 wherein said query is presented to said user as a result of said executable process attempting to install software on said local system and wherein said challenge comprises presenting a nonce to said user and requiring said user to enter said nonce.

* * * * *